(12) United States Patent
Lau et al.

(10) Patent No.: US 8,185,650 B2
(45) Date of Patent: May 22, 2012

(54) SYSTEMS, METHODS, AND COMPUTER PROGRAM PRODUCTS FOR TRANSMITTING AND/OR RECEIVING MEDIA STREAMS

(75) Inventors: Kam Hing Lau, Kowloon (HK); Ka Yuk Lee, Kowloon (HK); Kang Heng Wu, Yunfu (CN); Tak Wing Lam, Kowloon (HK)

(73) Assignee: Hong Kong Applied Science and Technology Research Institute Co., Ltd., Hong Kong (CN)

( * ) Notice: Subject to any disclaimer, the term of this patent is extended or adjusted under 35 U.S.C. 154(b) by 369 days.

(21) Appl. No.: 12/353,135

(22) Filed: Jan. 13, 2009

(65) Prior Publication Data

US 2010/0180043 A1 Jul. 15, 2010

(51) Int. Cl.
*G06F 15/16* (2006.01)
*G06F 15/173* (2006.01)
(52) U.S. Cl. ......... 709/231; 709/203; 709/217; 709/219
(58) Field of Classification Search ............... 709/203, 709/217, 219, 223, 231
See application file for complete search history.

(56) References Cited

U.S. PATENT DOCUMENTS

| | | | |
|---|---|---|---|
| 4,519,029 A | 5/1985 | Thompson | |
| 5,490,271 A | 2/1996 | Elliott et al. | |
| 6,721,850 B2 | 4/2004 | Hofmann et al. | |
| 6,981,050 B1 * | 12/2005 | Tobias et al. | 709/231 |
| 6,999,988 B2 | 2/2006 | Buddhikot et al. | |
| 7,076,544 B2 | 7/2006 | Katz et al. | |
| 7,099,953 B2 | 8/2006 | Horiuchi et al. | |
| 7,190,883 B2 | 3/2007 | Yeo | |
| 7,213,085 B2 | 5/2007 | Henshaw et al. | |
| 7,251,833 B2 | 7/2007 | Feig et al. | |
| 7,281,260 B2 * | 10/2007 | Puente et al. | 725/110 |
| 7,290,057 B2 * | 10/2007 | Saunders et al. | 709/231 |
| 7,359,980 B2 | 4/2008 | Gemmell | |
| 7,360,015 B2 | 4/2008 | Matthews et al. | |
| 7,577,714 B2 * | 8/2009 | Saunders et al. | 709/217 |
| 2001/0051996 A1 | 12/2001 | Cooper et al. | |
| 2002/0007404 A1 | 1/2002 | Vange et al. | |
| 2002/0103972 A1 | 8/2002 | Satran et al. | |
| 2002/0176418 A1 | 11/2002 | Hunt et al. | |
| 2003/0005457 A1 | 1/2003 | Faibish et al. | |
| 2003/0014603 A1 | 1/2003 | Sasaki et al. | |
| 2003/0018769 A1 | 1/2003 | Foulger et al. | |
| 2003/0110296 A1 | 6/2003 | Kirsch et al. | |
| 2003/0149720 A1 | 8/2003 | Goldstein | |
| 2003/0174648 A1 | 9/2003 | Wang et al. | |
| 2004/0003101 A1 | 1/2004 | Roth et al. | |
| 2004/0162946 A1 | 8/2004 | Day et al. | |
| 2004/0249965 A1 | 12/2004 | Huggins et al. | |
| 2006/0059223 A1 | 3/2006 | Klemets et al. | |
| 2006/0064500 A1 | 3/2006 | Roth et al. | |
| 2006/0259637 A1 | 11/2006 | Yadav et al. | |
| 2006/0282542 A1 | 12/2006 | Pinckney et al. | |
| 2008/0010410 A1 | 1/2008 | Zilbershtein et al. | |
| 2008/0159289 A1 | 7/2008 | Narayanan et al. | |
| 2008/0243996 A1 * | 10/2008 | Wu et al. | 709/203 |

\* cited by examiner

*Primary Examiner* — Quang N. Nguyen
(74) *Attorney, Agent, or Firm* — Fulbright & Jaworski L.L.P.

(57) ABSTRACT

A method includes receiving encoded media content, transforming the encoded media content into web page content by dividing the encoded media content into a plurality of web page files formatted as a static web page, and transmitting the web page content over the network in response to a request.

13 Claims, 5 Drawing Sheets

SYSTEMS, METHODS, AND COMPUTER PROGRAM PRODUCTS FOR TRANSMITTING AND/OR RECEIVING MEDIA STREAMS

RELATED APPLICATIONS

The present application is related to U.S. patent application Ser. No. 11/731,401, titled, "METHOD OF SIMULTANEOUSLY PROVIDING DATA TO TWO OR MORE DEVICES ON THE SAME NETWORK", filed Mar. 30, 2007, the disclosure of which is hereby incorporated herein by reference.

TECHNICAL FIELD

The present description relates, in general, to streaming media and, more specifically, to delivering streaming media content as web pages.

BACKGROUND

Many networks currently employ caching servers to decrease the amount of traffic to and from a media source located outside of the network. For instance, an Internet Service Provider (ISP) may utilize a caching server that stores web pages that are frequently accessed by the users on the network. Therefore, the ISP can decrease the amount of traffic from the ISP's network to the web server that is somewhere on the Internet.

Streaming media is becoming very popular, even for live events. Streaming media, though, is very demanding of bandwidth, especially for audio/video streams. One popular streaming client is QUICKTIME™, which can facilitate viewing of both pre-recorded and live events by using Real Time Streaming Protocol (RTSP). Such streaming, though, cannot be cached using current caching techniques. Specifically, different clients have different session IDs, and each session has a different session ID. The session ID is embedded in every packet from the server to a given client, and a general web caching server cannot cache the content because another client requesting the same stream will have a different session ID. From the web caching server's point of view, the two clients are requesting different things. Thus, the content is dynamic, even though multiple clients may consume the same content. Currently, there is no technique that allows for caching a media stream using conventional web caching techniques.

BRIEF SUMMARY

The present invention is directed to systems, methods, and computer program products which transform a media stream into web page files that can be cached by ordinary caching proxies. In one example, a unit on the server side receives a stream and divides the stream into chunks, where each chunk is a part of the stream. Each chunk is then packetized into a Hypertext Markup Language (HTML) file that includes, among other things, headers, decoder-specific information, and media packets.

Furthermore, session index files are created that index the HTML chunk files. In the case of a live stream, new chunk files and session index files are generated as the stream continues so that live data is processed and packetized in real time. When a client requests the streaming content, the web content files (including the chunk files and session index files) are transmitted to the client. A web caching proxy on the client's network can cache the content as it would any other web page.

On the client's side, the client receives and processes the web page content files to recover the media packets and meta data. The client sends the media packets to the decoder where the media content is decoded and rendered for the user.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
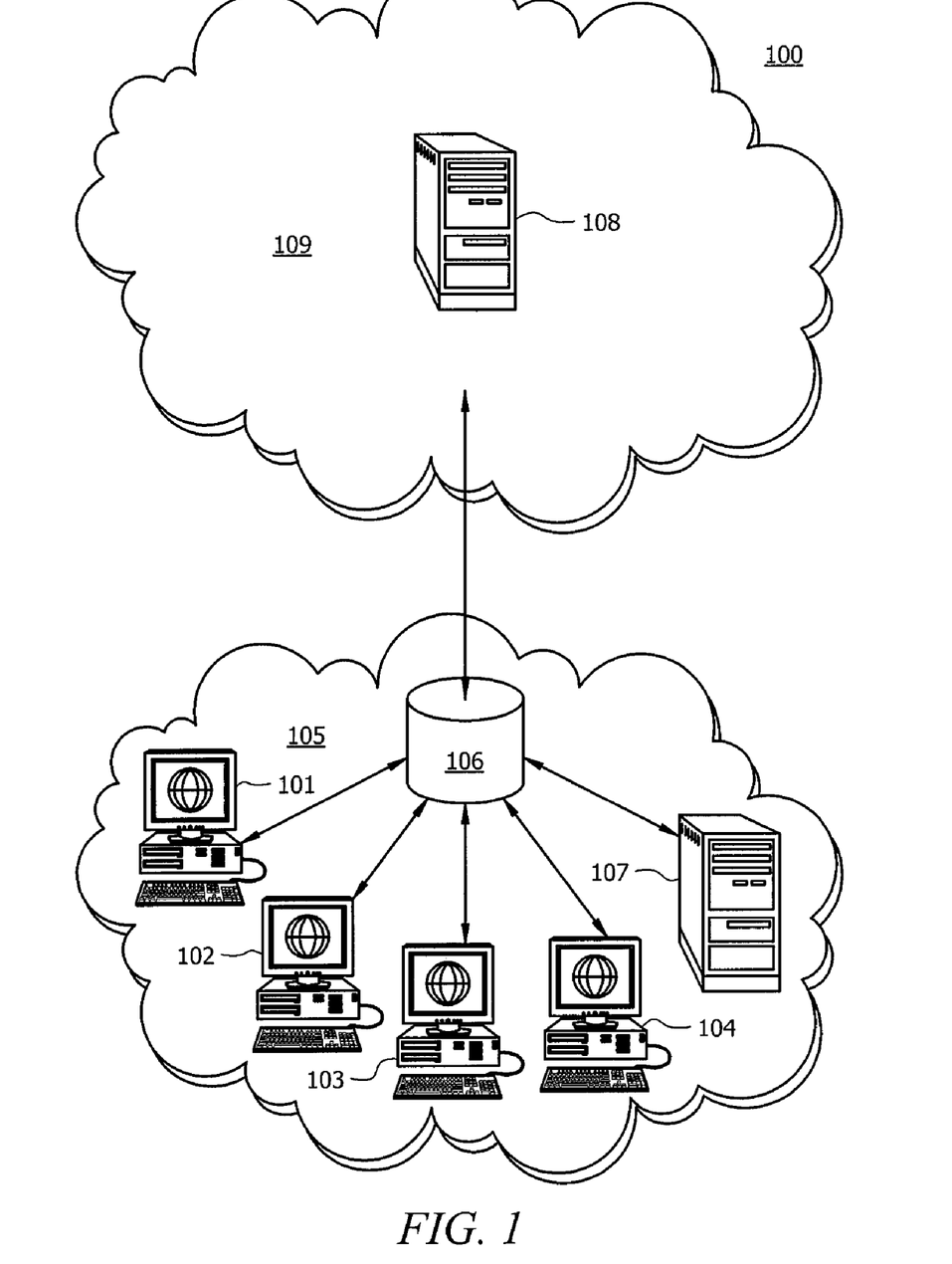
FIG. 1 is an illustration of an exemplary network arrangement in which an embodiment of the invention may be implemented and practiced.

FIG. 1 is an illustration of exemplary network arrangement 100 in which an embodiment of the invention may be implemented and practiced. Network arrangement 100 includes remotely located computers 101, 102, 103, and 104 that access the internet 109 and related services via the same internet service provider (ISP) network 105. Computers 101, 102, 103, and 104 connect to the ISP internet access network 105 using dial-up, Digital Subscriber Line (DSL) (typically asymmetric DSL), broadband wireless access, cable modem, ISDN and/or similar means. ISP network 105 includes router 106 and proxy server 107 that provides a service to allow the computers 101, 102, 103, and 104 to indirectly connect to other computers or servers (such as server 108) on the internet 109.

Proxy server 107 also includes a shared cache for the client computers 101, 102, 103, and 104. In this example proxy server 107 is a network computer that provides services to allow other computers or devices (e.g., computers 101, 102, 103, and 104) in network 105 to indirectly connect to computers or servers (e.g., server 108) in another network. In some embodiments, the proxy server and client computer are on a Local Area Network (LAN) or Internet access network and the other computer or server is on the Internet 109. Computers 101, 102, 103, and 104 on network 105 send a request for a resource available on server 108 to proxy server 107, which provides the resource either by passing the request to server 108 or by retrieving the resource from the shared cache in the proxy server 107.

In this example, the shared cache is provided by proxy server 107 connected to router 106 using Web Cache Communication Protocol (WCCP) developed by Cisco Systems. However, embodiments can employ other caching configurations and protocols operable to cache static web pages. Static web pages are most easily grasped when contrasted with dynamic web pages. Dynamic web pages use scripting to provide content that varies among visitors and sessions. For instance, some web pages include search fields and or other kinds of database queries so that user interaction pulls up information other than by simple linking. Another example of a dynamic web page is a page that shows an updated stock ticker. By contrast, a static web page is generally expected to provide the same content for a plurality of users in a plurality of sessions. Typical static pages present content changes to a user through linking. Various web sites provide pages that are both static and dynamic.

FIG. 1 shows a network arrangement wherein remote computers 101, 102, 103, and 104 access the Internet 109 directly through an ISP; however, various embodiments are not so limited. For instance, some embodiments can be applied to any network that connects together a plurality of devices that access remote data resources and which has a caching server or shared cache for temporarily storing requested data resources to reduce bandwidth requirements of the network gateway and speed up resource access times for the client's computers. Such a network may include a company, organization or private LAN or wide area network (WAN) where the devices may be in geographically close proximity or geographically different and remote locations. In particular, some embodiments may be particularly useful in a global organization having a plurality of interconnected regional networks in which two or more computers on one regional network access information or data resources on another regional network. For example, some embodiments may find useful application in streaming videoconferences, teleconferences or live presentations to the desktops of employees of an organization have offices at various geographically remote locations. Furthermore, some embodiments may also be implemented in television broadcast applications where client devices include set-top boxes for accessing streaming video resources from other networks, or in mobile networking applications where the client devices are mobile handsets.

According to the exemplary embodiment, server 108 provides streaming media content that can be accessed by computers 101, 102, 103, and 104. In this example, the streaming media content is processed by server 108 so that it is divided into a plurality of chunks and formatted as web page content. The streaming media content can include a live stream that is formatted to appear as a static web page by server 108. Therefore, the streaming media content can be cached by proxy server 107, which in this example, is a conventional and typical caching proxy that is able to cache simple items (e.g., static web pages) only.

Figure 2:
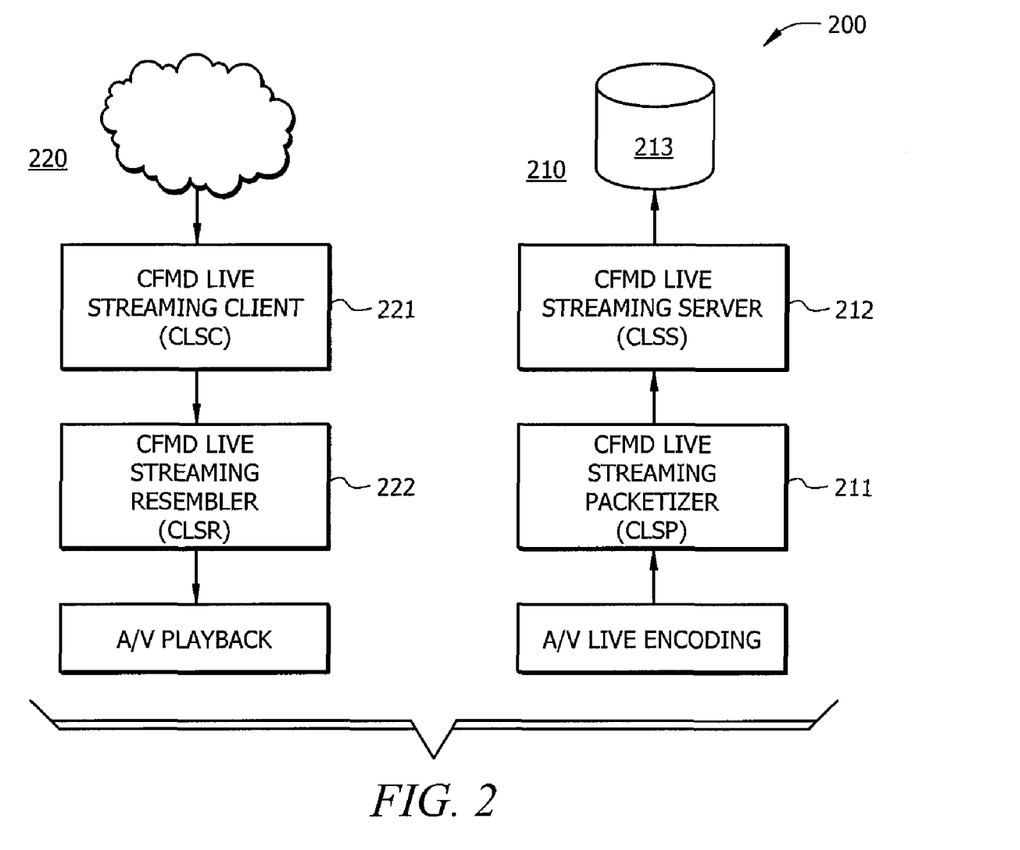
FIG. 2 is an illustration of an exemplary system adapted according to one embodiment of the invention.

FIG. 2 is an illustration of exemplary system 200 adapted according to one embodiment of the invention. FIG. 2 is a high-level overview of one embodiment for transmitting and receiving media streams. System 200 is divided into two sides—server side 210 and client side 220. At server side 210, a streaming application encodes audio and video signals into data packets. One example embodiment makes use of Advanced Audio Coding (AAC) for audio and H.264 encoding; however, other embodiments can use any kind of encoding, such as MP3 and/or the like. Live streaming packetizer 211 encapsulates audio and video packets into HTML files. In this example embodiment, the media stream is divided into a sequence of chunk files, where each chunk file contains a portion of the media stream (e.g., 0.2 seconds of audio and video). Additionally in this example, session index files are created which index the chunk files. Chunk files and session index files are described in more detail below.

Live streaming server 212 stores the HTML files in web server document directory 213 and/or transmits the HTML files to requesting clients (e.g., at client side 220). The web server that utilizes directory 213 can be hosted at the same machine as streaming server 212 and streaming packetizer 211 or at another machine that exports a document directory for streaming server 212 to write the output HTML files. In fact, server side 210 can be implemented in one or more processor-based machines.

At client side 220, live streaming client module 221 downloads the HTML files from web server 212. Live streaming resembler 222 extracts the audio and video packets from the downloaded HTML files. The extracted audio and video packets are fed into a decoder (not shown) that renders the audio and video data on one or more transducers (e.g., a video screen, speakers, etc).

While not shown in FIG. 2, it is understood that client side 220 in many scenarios is on a network that includes a proxy server capable of performing web caching. As such, the HTML files can be cached as web pages and sent to one or more other requesting clients on the network.

Figure 3:
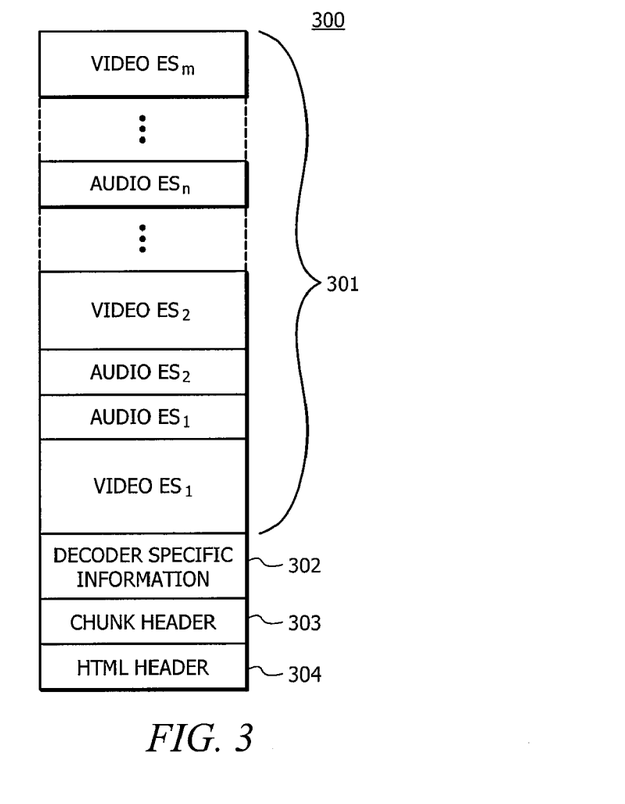
FIG. 3 is an illustration of an exemplary file, adapted according to one embodiment of the invention.

FIG. 3 is an illustration of exemplary file 300, adapted according to one embodiment of the invention. File 300 is an HTML file (i.e., a web page file) that includes media content and may be produced by streaming packetizer 211 of FIG. 2.

File 300 is a media payload HTML file (i.e., a chunk file) and is created by streaming packetizer 211. File 300 contains audio and video packets 301, which can be read from a data buffer acting as the output buffer of an encoder. Audio and video packets 301 in this example include Moving Picture Experts Group (MPEG) elementary stream (ES) packets that have some attribute information attached, such as timestamp. Other embodiments may use other kinds of encoding and, thus, other kinds of data packets.

File 300 is in Extensible HTML (XHTML) format, though standard HTML format can be used as well. Within the text of file 300, chunk header 303 is put in a <table> section in the <body> element, and lists out the timestamps and offsets of the various individual media packets within group of packets 301 within the file 300. Audio and video packets 301 are put in the <body> element and each individual packet in packets 301 is tagged by a <p> element and a corresponding ID specified in chunk header 303. HTML header 304 includes HTML-specific information, as is well known.

As shown in FIG. 3, within audio and video packets 301, the individual audio packets are interleaved into the series of video packets, so that a given audio packet with a timestamp that falls between the timestamps of individual two video packets is packed between the two video packets. With the arrangement shown in FIG. 3, audio/video synchronization can be performed easily, even in sequential parsing mode. In some embodiments, there is a predefined maximum chunk size, which is large enough to pack at least one video packet plus the corresponding audio packet, and can facilitate the proxy caching properties. However, the size of chunks and the number of media payload packets in a given embodiment can be adapted to be as large or as small as desired.

In this example, there are two kinds of chunk files—main chunk files and sub-chunk files. Each main chunk file can be used as a random access pint (RAP) of the multimedia stream and contains at least one video frame that can be decoded independently from other video frames (I-frame) and corresponding audio packets. Between two RAPs, packets are packed into sub-chunk files. Multiple sub-chunks may be created, and the ratio of main chunks to sub-chunks will usually be affected by how long the encoder generates a RAP and the maximum chunk file size. File 300 also includes decoder specific information 302, which, in this example, is sequence parameter set (SPS) and picture parameter set (PPS) information. However, other embodiments may use other kinds of encoding and, thus, use other kinds of decoder specific information. Table 1 shows the syntax of an example main chunk file.

TABLE 1

<!DOCTYPE html PUBLIC "-//W3C//DTD XHTML 1.0
Transitional//EN"
"http://www.w3.org/TR/xhtml1/DTD/xhtml1-transitional.dtd">
<html xmlns="http://www.w3.org/1999/xhtml">
  <head>
    <title>
      <!-- SN -->
    </title>
  </head>
  <body>
<!-- elements packed with no space and new-lines from this point until closing body tag --><table width="9999999999"><!-- chunk header --></table><p ID="S0000000000"><!-- SPS/PPS information, only available in main chunk --></p><p ID="V0000000001">
<!-- ... --></p><p ID="A0000000001"><!-- ... --></p><!-- ... --></p>
</body>
</html>

With reference made to Table 1, starting from the chunk header <table> tag, no extra space or new lines between tag elements are allowed in this example, so that the payload offset can be calculated during data generation. Chunk header 303 is a block of <table> element in the HTML <body> element. Chunk header 303 contains information for the client to parse the aggregated audio/video payloads in chunk file 300. Chunk header 303 defines IDs for each <p> element of the corresponding audio/video payloads.

TABLE 2

...
<table><tr ID="S00000000"><td CLASS="offset">0000001A</td><td CLASS="size">0000000F</td><td CLASS="ts">0000000000000000</td></tr><tr ID="V00000001"><td CLASS="offset">0000008B</td><td CLASS="size">00001FFF</td><td CLASS="ts">000000000000001A</td></tr><tr ID="A00000001"><td CLASS="offset">000020EC</td><td CLASS="size">00000120</td><td CLASS="ts">000000000000001A</td></tr><tr ID="A00000002"><td CLASS="offset">0000226E</td><td CLASS="size">000000F2</td><td CLASS="ts">0000000000000052</td></tr></table>
...

Table 2 shows an example portion of a chunk file that has decoder specific information and three media packets and can be included in chunk file 300. The example HTML data of Table 2 indicates that chunk file 300 contains four packets in the payload section (e.g., four individual media packets within audio/video packets 301). The first packet with ID S0 is SPS/PPS information. The SPS/PPS information indicates that the chunk is a main chunk. There is a video packet with ID V00000001, and two audio packets with ID A00000001 and A00000002. The offset indicates the location of the payload from the beginning of the <table> tag. The size is in the number of bytes. The IDs and attributes are given in hexadecimal values.

Each streaming session is assigned a session name (SN), e.g., a name of a broadcast channel. A main chunk file is named with SN followed by the main chunk sequence number, which is a 32-bit unsigned integer and starts from 1 to 4294967295 and then wraps around to 1. By contrast, sub-chunk files are named with SN followed by the main chunk sequence number, then an underscore and the sub-chunk sequence number, which is also a 32-bit unsigned integer. For example: SN=superman; Main chunk files are superman1.html, superman2.html, etc., and sub-chunk files are superman1_1.html, superman1_2.html, superman2_1, etc.

When creating web page files from media streams, streaming packetizer 211 (FIG. 2) also generates at least one other kind of file that is referred to in this example as a session index file. The server (i.e., the streaming server and caching proxy server, if applicable) maintains a session index file for each streaming session, which contains a list of the main chunks that have so far been generated. The client can know from the session index file which files to download. Newly joined clients can also derive from the session index file which main chuck file is the latest in order to join in a live stream with a minimum amount of time delay.

Furthermore, if applicable, the session index file also contains some meta data to facilitate rendering of the multimedia stream. The meta data is enclosed in a <ul> block and listed with attribute names and corresponding values. Syntax for an example session index file is shown in Table 3.

TABLE 3

...
  <head>
    <title>superman</title>
  </head>
  <body>
    <ul>
      <li ID="v_width">720</li>
      <li ID="v_height">576</li>
      <li ID="v_timescale">90000</li>
      ...
    </ul>
    <ol>
      <li ID="1">0</li>
      <li ID="2">2000</li>
      <li ID="3">3600</li>
    </ol>
  </body>
...

The example in Table 3 shows the SN of the session is "superman". There are three main chunk files created currently. The main chunk files are "superman1.html" with video RAP at timestamp 0, "superman2.html" with video RAP at timestamp 2000, "superman3.html" with video RAP at timestamp 3600. The session index file in this example is superman.html, and the chunk files are assumed to be located at the same path as the session index file. Table 4 shows an example generic session index file syntax.

TABLE 4

```
<!DOCTYPE html PUBLIC "-//W3C//DTD XHTML 1.0
Transitional//EN"
"http://www.w3.org/TR/xhtml1/DTD/xhtml1-transitional.dtd">
<html xmlns="http://www.w3.org/1999/xhtml">
   <head>
      <title>
         <!-- SN -->
      </title>
   </head>
   <body>
      <ul> <!-- metadata -->
         <!-- <li ID="attr">value</li> ... -->
      </ul>
      <ol> <!-- chunk index -->
         <!-- <li ID="seq">timestamp</li> ... -->
      </ol>
   </body>
</html>
```

Figure 4:
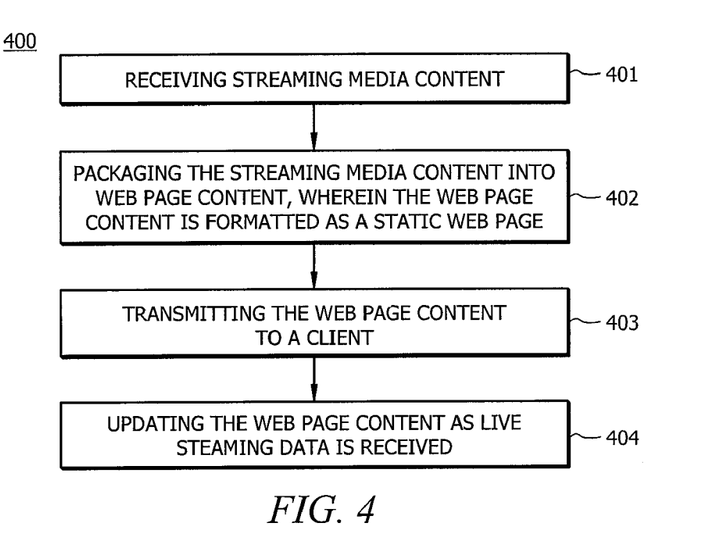
FIG. 4 is an illustration of an exemplary method adapted according to one embodiment of the invention.

FIG. 4 is an illustration of exemplary method 400 adapted according to one embodiment of the invention. Method 400 may be performed, for example, by one or more server-side processor-based machines.

In block 401, streaming media content is received. In one embodiment, the streaming media content is received from a multimedia encoder. Any kind of encoding now known or later developed can be adapted for use with various embodiments. Furthermore, the media content can be encoded by an application that is running on the same device as the application that receives the content.

In block 402, the streaming media content is packaged into web page content, wherein the web page content is formatted as a static web page. In one example, the format for chunks and files shown above with respect to FIG. 3 and Tables 1-4 is used. Various embodiments can use different formats as long as the media stream is transformed to a web page file that can be cached by general web cache proxy servers using techniques for caching static web pages.

In block 403, the web page content is transmitted to a client. The transmitting is typically performed in response to a request by the client for the media stream. In some embodiments, a proxy caching server sits between the web server that provides the web page content and the client that requests the web page content. In such a scenario, it is possible that the proxy caching server may cache the web page content as it is sent from the web server to the client. Thereafter, subsequent requesting clients on the proxy caching server's network will receive the content from the proxy caching server rather than from the web server.

In block 404, the web page content is updated as live streaming data is received. For example, new session index files are generated periodically, or otherwise, as the live media stream continues. The new session index files can overwrite, or exist in addition to, older session index files and provide indexing for the newly created chunk files. The client retrieves the updated session index file, as is further described below with respect to FIG. 5.

Figure 5:
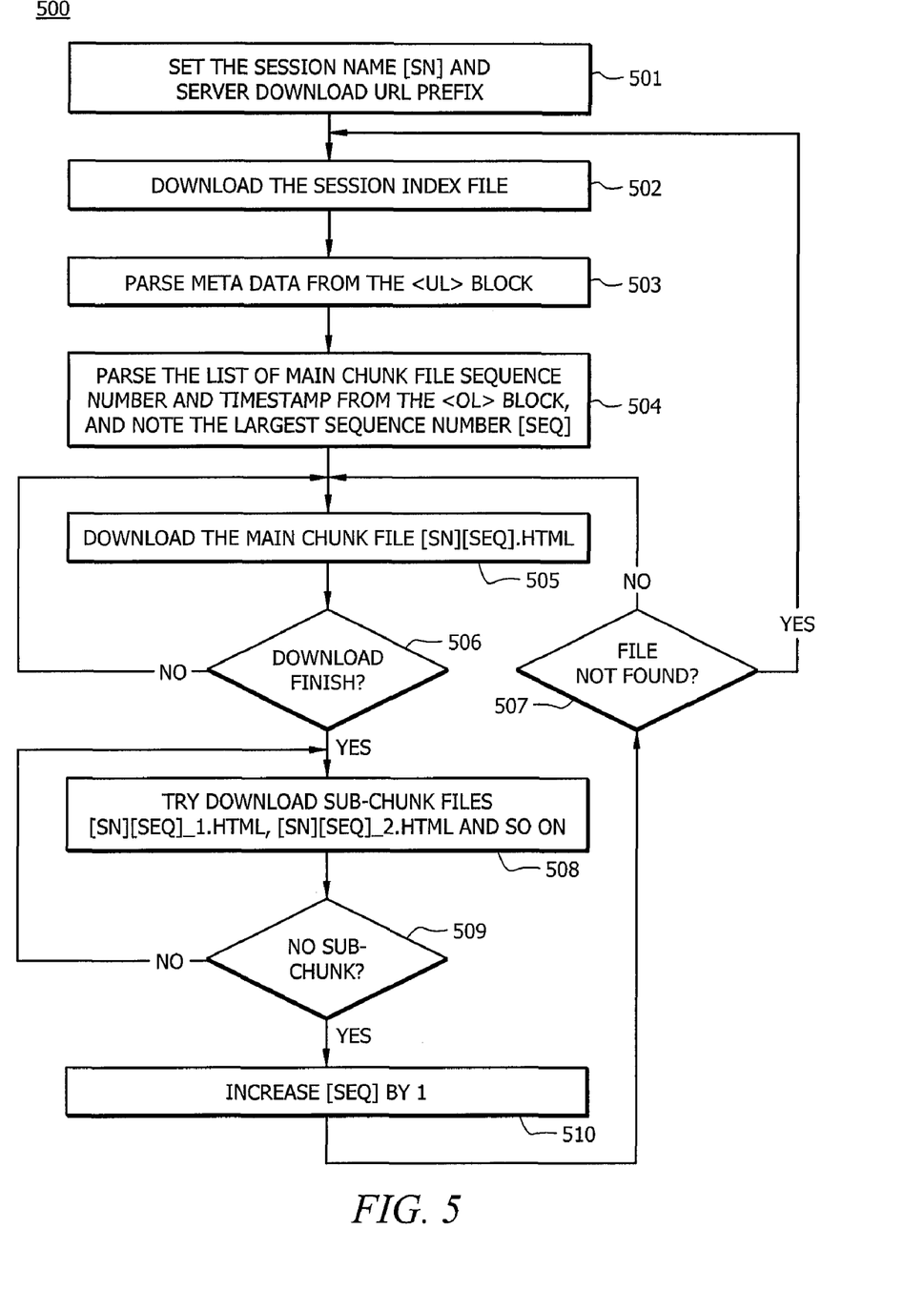
FIG. 5 is an illustration of an exemplary method adapted according to one embodiment of the invention.

FIG. 5 is an illustration of exemplary method 500 adapted according to one embodiment of the invention. Method 500 can be performed by a client device running an application that receives, decodes, and renders media streams that are sent as web page files. For example, a client device may include a cellular phone, a Personal Digital Assistant (PDA), a laptop or desktop computer, and/or the like.

It is assumed, in this example, that the client knows the SN and the appropriate server URL to download the session index file at blocks 501 and 502. After getting the session index file, the client parses the session index file to determine the first main chunk to download at blocks 503 and 504 [meta data for media data is in 301, decoder specific info]. For a live stream, the first main chunk file to download is the last (latest) main chunk file currently available. The client then downloads the chunk files in blocks 505-510 by downloading the main chunk files and the corresponding sub-chunk files. In this example, the URL prefix for downloading chunk files is assumed to be the same as the session index file, though such an arrangement can be changed in other embodiments.

The client keeps track of the current main chunk sequence number and the sub-chunk sequence number. When the client is finished downloading a main chunk file, it tries to download the sub-chunk file with the same main chunk sequence number and sub-chunk sequence number one, as in block 508. When download of a sub-chunk file is done, the client tries to download the next sub-chunk file with the sub-chunk sequence number incremented up. When a sub-chunk file is not found at the server, the client assumes that the stream is at the next RAP and the next main chunk file should be downloaded at block 505. If the next main chunk is not in the session index file or the client fails to download the next main chunk, the client tries to download the session index file again in case the session index file has been updated (e.g., during a live streaming session), as in block 507.

In this example, the client has random access to the available main chunk file according to the list of main chunk sequence numbers in the session index file. The main chunk files are RAPs, so that the client can implement trick mode play back (e.g., rewind, pause, seek, fast forward, etc.) by accessing the main files in a pattern that provides the particular trick mode operability.

Various embodiments are not limited to the example shown in FIGS. 4 and 5, as other embodiments may add, delete, rearrange, and/or modify one or more actions in methods 400 and 500. For instance, some embodiments continually perform iterations of method 400 as long as a stream continues.

Various embodiments provide advantages over prior art techniques. For instance, the examples above provide a media stream as web page content that appears as a static web page. Therefore, streaming techniques using the above-described disassembling scheme can make use of general web caching architecture which has been deployed in many networks.

Furthermore, above-described content disassembling technique is a post-processing step on the server side that, in some embodiments, is transparent to the existing content creation process and encoding. Therefore, the content disassembling technique can be performed offline or even at real-time. Similarly, the client-side content assembling technique is a pre-processing step that, in some embodiments, is transparent to the existing player/decoder utilized by the client. The client-side content assembling can be performed offline or even at real-time.

When implemented via computer-executable instructions, various elements of embodiments of the present invention are in essence the software code defining the operations of such various elements. The executable instructions or software code may be obtained from a readable medium (e.g., a hard drive media, optical media, RAM, EPROM, EEPROM, tape media, cartridge media, flash memory, ROM, memory stick, and/or the like). In fact, readable media can include any medium that can store information.

Figure 6:
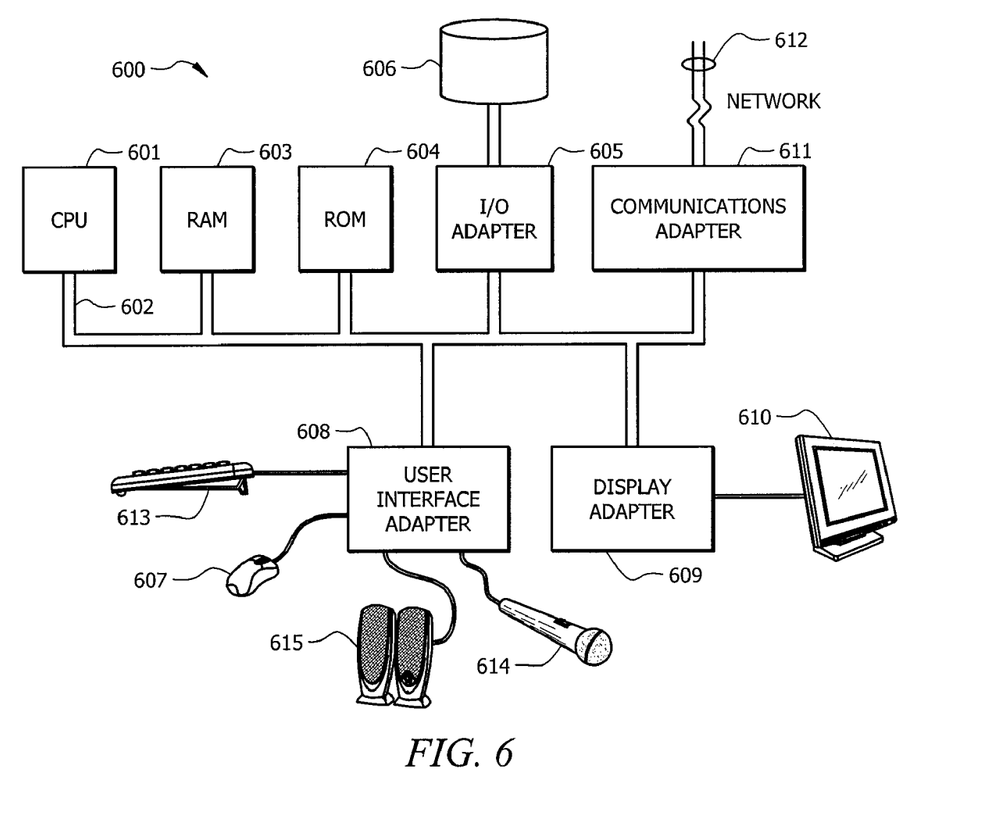
FIG. 6 illustrates an example computer system adapted according to one embodiment of the present invention.

FIG. 6 illustrates an example computer system 600 adapted according to one embodiment of the present invention. That is, computer system 600 comprises an example system on which embodiments of the present invention may be implemented (such as a client device that executes a client application or a server computer that transforms a media stream into web page content). Central processing unit (CPU) 601 is coupled to system bus 602. CPU 601 may be any general purpose or specialized purpose CPU. However, the present invention is not restricted by the architecture of CPU 601 as long as CPU 601 supports the inventive operations as described herein. CPU 601 may execute the various logical instructions according to embodiments of the present invention. For example, one or more CPUs, such as CPU 601, may execute machine-level instructions according to the exemplary operational flows described above in conjunction with FIGS. 4 and 5.

Computer system 600 also preferably includes random access memory (RAM) 603, which may be SRAM, DRAM, SDRAM, or the like. In this example, computer system 600 uses RAM 603 to buffer 302 of FIG. 3. Computer system 600 preferably includes read-only memory (ROM) 604 which may be PROM, EPROM, EEPROM, or the like. RAM 603 and ROM 604 hold user and system data and programs, as is well known in the art.

Computer system 600 also preferably includes input/output (I/O) adapter 605, communications adapter 611, user interface adapter 608, and display adapter 609. I/O adapter 605, user interface adapter 608, and/or communications adapter 611 may, in certain embodiments, enable a user to interact with computer system 600 in order to input information, such as selecting media streams.

I/O adapter 605 preferably connects to storage device(s) 606, such as one or more of hard drive, compact disc (CD) drive, floppy disk drive, tape drive, etc. to computer system 600. The storage devices may be utilized when RAM 603 is insufficient for the memory requirements associated with storing media data. Communications adapter 611 is preferably adapted to couple computer system 600 to network 612 (e.g., the Internet, a LAN, a cellular network, etc.). User interface adapter 608 couples user input devices, such as keyboard 613, pointing device 607, and microphone 614 and/or output devices, such as speaker(s) 615 to computer system 600. Display adapter 609 is driven by CPU 601 to control the display on display device 610 to, for example, display the media as it is played.

While FIG. 6 shows a general-purpose computer, it should be noted that the exact configuration of a portion of a system according to various embodiments may be slightly different. For example, devices according to one or more embodiments may be any kind of processor-based device, such as a cell phone, a PDA, a specialized device (e.g., a stand-alone P2P television module, or a Home Media Center available from Hong Kong Applied Science and Technology Research Institute Company Limited, that streams television content), and/or the like. Additionally, servers (e.g., streaming and packetizing servers) according to one or more embodiments may be any kind of processor-based device capable of sending media streams, such as a personal computer, a server-type computer, a Home Media Center, and/or the like. Moreover, embodiments of the present invention may be implemented on application specific integrated circuits (ASICs) or very large scale integrated (VLSI) circuits. In fact, persons of ordinary skill in the art may utilize any number of suitable structures capable of executing logical operations according to the embodiments of the present invention.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A computer program product having a non-transitory computer readable medium having computer program logic recorded thereon, the computer program product comprising:
   code for receiving streaming audio and video content;
   code for packaging the streaming audio and video content into web page content, wherein said code for packaging comprises:
      code for dividing the streaming audio and video content into a plurality of temporally sequential chunks, each of the plurality of temporally sequential chunks contained in a respective web page file; and
      code for generating a session index file that indexes the plurality of temporally sequential chunks; and
   code for transmitting the web page content to a client;
   wherein the plurality of temporally sequential chunks comprise a plurality of main chunks serving as random access points in a media stream and a plurality of sub-chunks, each of the sub-chunks being associated with a main chunk;
   code for updating the web page content as live streaming data is received, wherein the code for updating the web page content comprises code for creating audio and video content files from the live streaming data as the live streaming data is received, and code for generating updated session index data indexing the audio and video content files.

2. The computer program product of claim 1 wherein, after said packaging, the web page content comprises:
   a Hypertext Markup Language (HTML) file encapsulating encoded audio and video data.

3. The computer program product of claim 2, wherein the web page content is formatted as a static web page.

4. The computer program product of claim 1 wherein the web page content comprises:
   an HTML file including an index of chunks of the streaming audio and video content.

5. The computer program product of claim 1 wherein the web page content comprises:
   an HTML file in Extensible HTML (XHTML) format.

6. A computer program product having a non-transitory computer readable medium having computer program logic recorded thereon for playing a media stream, the computer program product comprising:
   code for receiving web page content, said web page content encapsulating a plurality of temporally sequential audio and video content chunks divided from a streaming audio and video content, each of the plurality of temporally sequential audio and video content chunks contained in a respective web page file formatted as a static web page and said web page content including at least one session index files indexing the plurality of temporal sequential audio and video content chunks, the plurality of temporal sequential audio and video content chunks comprising content of the media stream;

code for using the index to determine a starting point in the media stream; and code for decoding the plurality of temporally sequential audio and video content chunks and rendering the media stream;

wherein the plurality of temporally sequential audio and video content chunks comprise a plurality of main chunks serving as random access points in the media stream and a plurality of sub-chunks, each of the sub-chunks being associated with a main chunk.

7. The computer program product of claim 6 wherein the code for rendering the audio and video content comprises:

code for using the individually selectable audio and video content chunks to provide one or more play modes selected from the list consisting of:
a rewind mode;
a skip mode;
a seek mode; and
a fast forward mode.

8. The computer program product of claim 6, wherein the received web page content is formatted as a static web page.

9. A method performed by a computer in a network, the method comprising:

receiving encoded audio and video content;

transforming the encoded audio and video content into web page content by dividing the encoded audio and video content into a plurality of temporally sequential chunks, each of the plurality of temporally sequential chunks contained in a respective web page file formatted as a static web page, creating a plurality of Hypertext Markup Language (HTML) files that encapsulate packets of the encoded audio and video content, and creating a session index file that lists identifications of at least some of the HTML files; and transmitting the web page content over the network in response to a request;

wherein the plurality of temporally sequential chunks comprise a plurality of main chunks serving as random access points in the media stream and a plurality of sub-chunks, each of the sub-chunks being associated with a main chunk;

wherein the encoded audio and video content comprises a live media stream, the method further comprising:

updating the web page content as the live audio and video content stream progresses; and transmitting the updated web page content.

10. The method of claim 9 wherein at least one of said HTML files provide random access points to the encoded audio and video content.

11. A method performed by a computer in a network, the method comprising:

making a request to a network resource;

receiving web page content as a result of the request, the web page content encapsulating a plurality of temporally sequential encoded audio and video chunks divided from a streaming audio and video content, each of the plurality of temporally sequential encoded audio and video chunks contained in a respective web page file formatted as a static web page and wherein the web page content includes index data that lists identifications of at least some of said encoded audio and video chunks; and rendering the web page content as a stream of audio and video;

wherein the plurality of temporally sequential encoded audio and video chunks comprise a plurality of main chunks serving as random access points in the stream of audio and video and a plurality of sub-chunks, each of the sub-chunks being associated with a main chunk.

12. The method of claim 11 wherein the rendering comprises:

decoding audio and video content in the plurality of temporally sequential encoded audio and video chunks; and transforming the decoded audio and video content into humanly perceptible signals at a transducer.

13. The method of claim 12 wherein rendering the web page content comprises:

accessing encoded audio and video packets within the web page content;

decoding the encoded audio and video packets; and presenting the media stream using one or more transducers of the computer.

* * * * *

UNITED STATES PATENT AND TRADEMARK OFFICE
CERTIFICATE OF CORRECTION

PATENT NO.        : 8,185,650 B2
APPLICATION NO.   : 12/353135
DATED             : May 22, 2012
INVENTOR(S)       : Kam H. Lau et al.

Page 1 of 1

It is certified that error appears in the above-identified patent and that said Letters Patent is hereby corrected as shown below:

In the Claims:

Column 12, Claim 9, Line 1, delete "in the media" and replace with --in a media--.

Column 12, Claim 9, Lines 6-7, delete "audio and video content" and replace with --media--.

Column 12, Claim 10, Line 9, delete "at least one" and replace with --at least some--.

Signed and Sealed this
Tenth Day of July, 2012

David J. Kappos
*Director of the United States Patent and Trademark Office*